(12) United States Patent
Yuang et al.

(10) Patent No.: US 9,807,477 B2
(45) Date of Patent: Oct. 31, 2017

(54) OPTICAL DATA CENTER NETWORK SYSTEM AND OPTICAL SWITCH

(71) Applicant: National Chiao Tung University, Hsinchu (TW)

(72) Inventors: Maria C. Yuang, Hsinchu (TW); Po-Lung Tien, Hsinchu County (TW); Hsing-Yu Chen, Taipei (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 14/922,201

(22) Filed: Oct. 26, 2015

(65) Prior Publication Data

US 2016/0277816 A1 Sep. 22, 2016

(30) Foreign Application Priority Data

Mar. 20, 2015 (TW) .............................. 104108991 A (51) Int. Cl.
| | |
|---|---|
| *H04Q 11/00* | (2006.01) |
| *G02B 6/35* | (2006.01) |
| *G02B 6/44* | (2006.01) |
| *G02B 6/293* | (2006.01) |
| *H04J 14/02* | (2006.01) |

(52) U.S. Cl.
CPC ..... *H04Q 11/0005* (2013.01); *G02B 6/29386* (2013.01); *G02B 6/356* (2013.01); *G02B 6/3556* (2013.01); *G02B 6/4404* (2013.01); *H04J 14/0212* (2013.01); *H04Q 2011/0016* (2013.01)

(58) Field of Classification Search
CPC .................................................. H04Q 11/0005
See application file for complete search history.

(56) References Cited

U.S. PATENT DOCUMENTS

| | | | |
|---|---|---|---|
| 6,694,412 B2 * | 2/2004 | Frank .................. | G06F 9/30003 711/153 |
| 8,625,991 B1 * | 1/2014 | Sindhu .............. | H04Q 11/0071 372/29.01 |

(Continued)

FOREIGN PATENT DOCUMENTS

TW 201203891 1/2012

OTHER PUBLICATIONS

"Data Center Networking—connectivity and Topology Design Guide", Enterasys Networks, 2011.*

(Continued)

*Primary Examiner* — Shi K Li
(74) *Attorney, Agent, or Firm* — JCIPRNET (57) ABSTRACT

An optical data center network system including multiple tier-1 optical switches, multiple tier-2 optical switches and multiple tier-3 optical switches is provided. A pod is formed by the tier-1 optical switches connected to each other through ribbon fibers. A macro pod is formed by the tier-2 optical switches connected to each other through ribbon fibers, and each of the tier-2 optical switches is connected to all of the tier-1 optical switches in one pod. The tier-3 optical switches are connected to each other through ribbon fibers, and each of the tier-3 optical switches is connected to all of the tier-2 optical switches in one macro pod. Each optical switch in each tier is implemented by using the Wavelength Selective Switch (WSS) as a basic element, which has been commercialized numerously.

12 Claims, 7 Drawing Sheets

(56) References Cited

U.S. PATENT DOCUMENTS

| | | | |
|---|---|---|---|
| 2003/0131044 A1* | 7/2003 | Nagendra | H04L 29/06 709/201 |
| 2010/0254703 A1 | 10/2010 | Kirkpatrick et al. | |
| 2012/0321310 A1 | 12/2012 | Spock et al. | |
| 2013/0108264 A1 | 5/2013 | deRuijter et al. | |
| 2013/0156425 A1* | 6/2013 | Kirkpatrick | H04B 10/801 398/45 |
| 2014/0119728 A1* | 5/2014 | Zhang | H04J 14/0204 398/48 |
| 2014/0270761 A1 | 9/2014 | Xu et al. | |
| 2015/0098700 A1 | 4/2015 | Zhu et al. | |
| 2016/0261628 A1* | 9/2016 | Doron | H04L 63/1458 |

OTHER PUBLICATIONS

G. Bernstein, "New Switch Architectures and the Impact to the 40/100GBE Transition in the Data Center", Data Center Journal, Dec. 2013; downloaded from www.datacenterjournal.com.*

Yuang et al., "OPMDC: Architecture Design and Implementation of a New Optical Pyramid Data Center Network," Journal of Lightwave Technology, May 15, 2015, pp. 2019-2031.

Ye et al., "DOS—A Scalable Optical Switch for Datacenters," 2010 ACM/IEEE Symposium on Architectures for Networking and Communications Systems (ANCS), Oct. 25-26, 2010, pp. 1-12.

Proietti et al., "40 Gb/s 8x8 Low-latency Optical Switch for Data Centers," Optical Fiber Communication Conference, Mar. 2011, pp. 1-4.

Hemenway et al., "An Optical Packet-Switched Interconnect for Supercomputer Applications," Journal of Optical Networking, Special Issue on Supercomputer Interconnects, Oct. 2004, pp. 1-16.

Intune Networks, "Optical Packet Switch and Transport," 2010, pp. 1-10.

Chen et al., "OSA: An Optical Switching Architecture for Data Center Networks With Unprecedented Flexibility," IEEE/ACM Transactions on Networking, Apr. 2014, pp. 498-511.

"Office Action of Taiwan Counterpart Application", dated Jun. 2, 2016, p. 1-p. 5.

* cited by examiner

OPTICAL DATA CENTER NETWORK SYSTEM AND OPTICAL SWITCH

CROSS-REFERENCE TO RELATED APPLICATION

This application claims the priority benefit of Taiwan application serial no. 104108991, filed on Mar. 20, 2015. The entirety of the above-mentioned patent application is hereby incorporated by reference herein and made a part of this specification.

BACKGROUND

Field of the Disclosure

The disclosure relates to a network system, and particularly relates to an optical data center network system and an optical switch.

Description of Related Art

Data center networks (DCNs) have been designed to provide reliable and efficient network infrastructure for a data center to support a wide variety of today's cloud or enterprise applications and services, e.g., grid/cloud computing, data storage, data mining and social networking, etc. Evidence shows that these applications/services not only involve much client-server (i.e., north-south) traffic flowing in and out within DCNs, but also spawn a massive amount of east-west server-to-server traffic within DCNs. These applications and services are data rich by nature, and demand high bandwidth and low latency transport of data. Besides, recent studies have further shown an ever-growing trend toward the variety and complexity of new cloud or enterprise applications and services. Such trend places a higher demand for large-scale DCN that can deliver substantially high bandwidth, low latency/jitter and reduced power consumption. For large-scale DCNs, there has been an increasing tendency towards modular design. The module-oriented data center can be constructed from purpose-engineered modules, e.g., pods or containers, which can be flexibly expanded to the original data center infrastructure in an architecture complaint manner. Besides, it is of crucial importance for future DCNs to adopt incremental design. The incremental design allows a rollout and seamless expansion, resulting in agile and economical deployment and delivering resources on fully as-needed basis.

Current DCNs architectures can be distinguished according to whether an all-optical switch is adopted, where the DCN architectures without the all-optical switch generally still apply an electrical switch for data switching. Although the DCN architectures applying the electrical switch adopt optical fibers to transmit data between the switches, a transmission rate thereof is still limited by the electrical switch. Moreover, during a data transmission process, a photoelectric converter has to be used to implement multiple optical-to-electrical conversions or electrical-to-optical conversions, which causes a large power consumption. Moreover, since the number of input/output ports of the electrical switch is limited, and one optical fiber can only contain one wavelength band, the number of cables used for network connection is huge, which greatly increases a degree of difficulty in deployment and maintenance, and accordingly increases difficulty in network expansion.

In order to resolve the above problems, related literatures provide a plurality of photoelectric mixed architectures and full optical architectures. The photoelectric mixed architecture still has the problem of electrical-to-optical conversion, so that the problem in power consumption is not effectively resolved. Comparatively, the full optical architecture does not switch data through electricity, so that power consumption in electrical-to-optical conversion is greatly decreased. For example, in a double tier annular wavelength division multiplexing (WDM) optical data center network architecture, only two nodes located at the head and tail in the annular network are connected to the nodes of a previous tier, and if a signal is to be transmitted to a certain node in a different annular architecture, the signal has to pass through the nodes at the head and tail in the two annular networks, and is then sequentially transmitted to a designation through an annular manner, which can cause a large latency. Moreover, a connection port of a WDM add/drop module used in the architecture corresponds to a fixed wavelength, which greatly limits a path selection capability between the servers in the architecture. In addition, the architecture is only designed to accommodate the switching nodes of two tiers, and if the architecture is to be extended, only the number of the nodes of the first two tiers can be increased. However, if excessive nodes are used in the ring of the same tier, it may cause a high latency, which seriously limits scalability of the architecture.

Another DCN architecture includes tunable optical transceivers, tunable wavelength converters (TWCs), arrayed waveguide grating routers (AWGRs), buffer registers, etc., where the tunable optical transceivers are expensive, and the buffer registers are electric components other than optical components, which requires electrical-to-optical conversion so that data could be stored in temporarily. Moreover, system scalability of such DCN architecture is limited by the number of connection ports of the AWGRs, so that the scalability thereof is poor.

One DCN architecture adopts a micro-electro-mechanical system (MEMS) to ensure a direct connection between top of rack (ToR) switches, which causes the high path-configuration complexity. Moreover, several milliseconds generally are required for the reconfiguration time of the MEMS paths, which sets a limit on the switching time for the DCN. In summary, the existing DCN architectures can only resolve or satisfy a part of bottlenecks and demands of the full-optical-switching systems.

SUMMARY

The disclosure is directed to an optical data center network system and an optical switch, which features scalability, high bandwidth, low latency, high reliability, low power consumption and low wiring complexity.

The disclosure provides an optical data center network system including a plurality of tier-1 optical switches, a plurality of tier-2 optical switches and a plurality of tier-3 optical switches. The tier-1 optical switches are connected to each other through ribbon fibers to from a pod. The tier-2 optical switches are connected to each other through ribbon fibers to form a macro pod, and each of the tier-2 optical switches is connected to all of the tier-1 optical switches in one pod. Finally, the tier-3 optical switches are connected to each other through ribbon fibers, and each of the tier-3 optical switches is connected to all of the tier-2 optical switches in one macro pod.

The disclosure provides an optical switch adapted to a tier-1 of an optical data center network system. The optical switch includes a plurality of latitudinal ports, a plurality of longitudinal ports, a multiplexer, a wavelength selective switch and an optical signal amplifier and an optical signal splitter. An input port of the optical signal splitter is coupled to the optical signal amplifier, and an output port of the optical signal splitter is coupled to one of the longitudinal ports and a first latitudinal port and a second latitudinal port in the latitudinal ports. The light transmitting directions of the first latitudinal port and the second latitudinal port are opposite to each other. The multiplexer receives a plurality of optical signals, and combines the optical signals into a combined optical signal. The optical signal amplifier receives the combined optical signal and amplifies the combined optical signal. The optical signal splitter receives the combined optical signal, and duplicates three copies of the combined optical signal to generate the first transmission optical signal, the second transmission optical signal and the third transmission optical signal. Then, the optical signal splitter respectively transmits the first transmission optical signal, the second transmission optical signal and the third transmission optical signal through the output port of the optical signal splitter to one of the longitudinal ports, the first latitudinal port and the second latitudinal port.

In an embodiment of the disclosure, the optical switch further includes a wavelength selective switch and a demultiplexer. The wavelength selective switch is coupled to part or all of the latitudinal ports and part or all of the longitudinal ports. The demultiplexer is coupled to the WSS. The wavelength selective switch receives a plurality of received optical signals from part or all of the latitudinal ports and part or all of the longitudinal ports, and switches to transmit one of the received optical signals to the demultiplexer. The demultiplexer demultiplexes the received optical signal into a plurality of optical signals, and transmits the optical signals.

The disclosure provides an optical switch adapted to a tier-2 of an optical data center network system. The optical switch includes a plurality of latitudinal ports, a plurality of longitudinal ports and a wavelength selective switch. The optical switch is connected to other optical switches in a macro pod in the optical data center network system through the latitudinal ports that are connected to ribbon fibers, and is connected to a pod and a tier-3 optical switch connected to the macro pod in the optical data center network system through the longitudinal ports. The wavelength selective switch has M input ports and N output ports, where M and N are positive integers. A sum of M and N is equal to a sum of the latitudinal ports and the longitudinal ports of the tier-2 optical switch, where the number of the latitudinal ports is greater than or equal to $$\text{round}\left[\frac{B \cdot P \cdot (1-P)}{2}\right] \cdot (B-1) \cdot 2,$$

where P value is a predetermined constant value between 0 and 1, and B value is the number of the optical switches in the macro pod. The longitudinal ports include a plurality of north longitudinal ports and a plurality of south longitudinal ports, where the number of the north longitudinal ports is greater than or equal to round $[B \cdot (1-P)] \cdot 2$.

The disclosure provides an optical switch adapted to a tier-3 of an optical data center network system. The optical switch includes a plurality of latitudinal ports, a plurality of longitudinal ports and a wavelength selective switch. The optical switch is connected to other optical switches through the latitudinal ports connected to ribbon fibers, and is connected to a macro pod in the optical data center network system through the longitudinal ports. The wavelength selective switch has Q input ports and R output ports, where Q and R are positive integers, and a sum of Q and R is equal to a sum of the latitudinal ports and the longitudinal ports of the optical switch. The number of the latitudinal ports of each tier-3 optical switch is greater than or equal to $$\text{round}\left[\frac{B^2 \cdot P \cdot (1-P)}{2}\right] \cdot (B-1) \cdot 2,$$

where P value is a predetermined constant value between 0 and 1, and B value is the number of the optical switches.

According to the above descriptions, the disclosure provides the optical data center network system and the optical switch, and the architecture of the optical switch network system is formed in a modular manner. Due to a recursive-interconnected pyramid architecture, the number of connections required by the optical switch network system is greatly decreased, and a path length required for data switching between the servers could greatly decreased. Therefore, requirements of low latency and low connection complexity would be achieved. Due to the modular design, the overall data center network system is easy to add new modules (i.e. the new pod or a single optical switch, etc.), so as to achieve high system scalability.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Although current data center networks (DCNs) employ optical transmission, electrical switches are still used to switch packets, for example, top of rack (ToR) switches, aggregation switches and core switches, etc. These electrical switches are generally connected to each other in two kinds of architectures: a scale-up architecture and a scale-out architecture.

The scale-up architecture adopts a hierarchical structure in which the switches at higher level of hierarchy have higher capacity and more connection ports to meet an increasing traffic demand. In order to ensure sustainable scalability, the scale-up architecture adopts oversubscription between tiers, such that the bisection bandwidth offered can be less than the worst-case aggregate bandwidth. The scale-up architecture is quite efficient in short term, however a lot of problems may still be caused by a poor modularity capability, gradually increased latency and latency variation.

On the other hand, in the scale-out architecture, a large number of low-cost tier-1 ToR switches and tier-2 aggregation switches are used to deliver a full bisectional bandwidth with extensive path diversity between servers. The scale-out architecture assures that the entire DCNs are congestion-free at any time, and achieves good modularity capability and low latency. However, the trade off includes higher wiring complexity, management cost, and bandwidth underutilization in average case. Both of the scale-up architecture and the scale-out architecture, however, result in high power consumption due to use power-hungry optical-to-electrical (O/E) and electrical-to-optical (E/O) transceivers.

Generally, an oversubscription ratio of the congestion-free DCNs is being close to 1. That is, in the DCNs, a total input link rate of any switch is equal to a total output link rate thereof. However, regarding the cost required for achieving the above goal, complex switches are required for the scale-up architecture. Management and wiring complexity, etc would be problems for the scale-out architecture. Therefore, the disclosure provides a congestion-free optical data network system, which achieves both manageability and high/scalable bandwidth.

Figure 1:
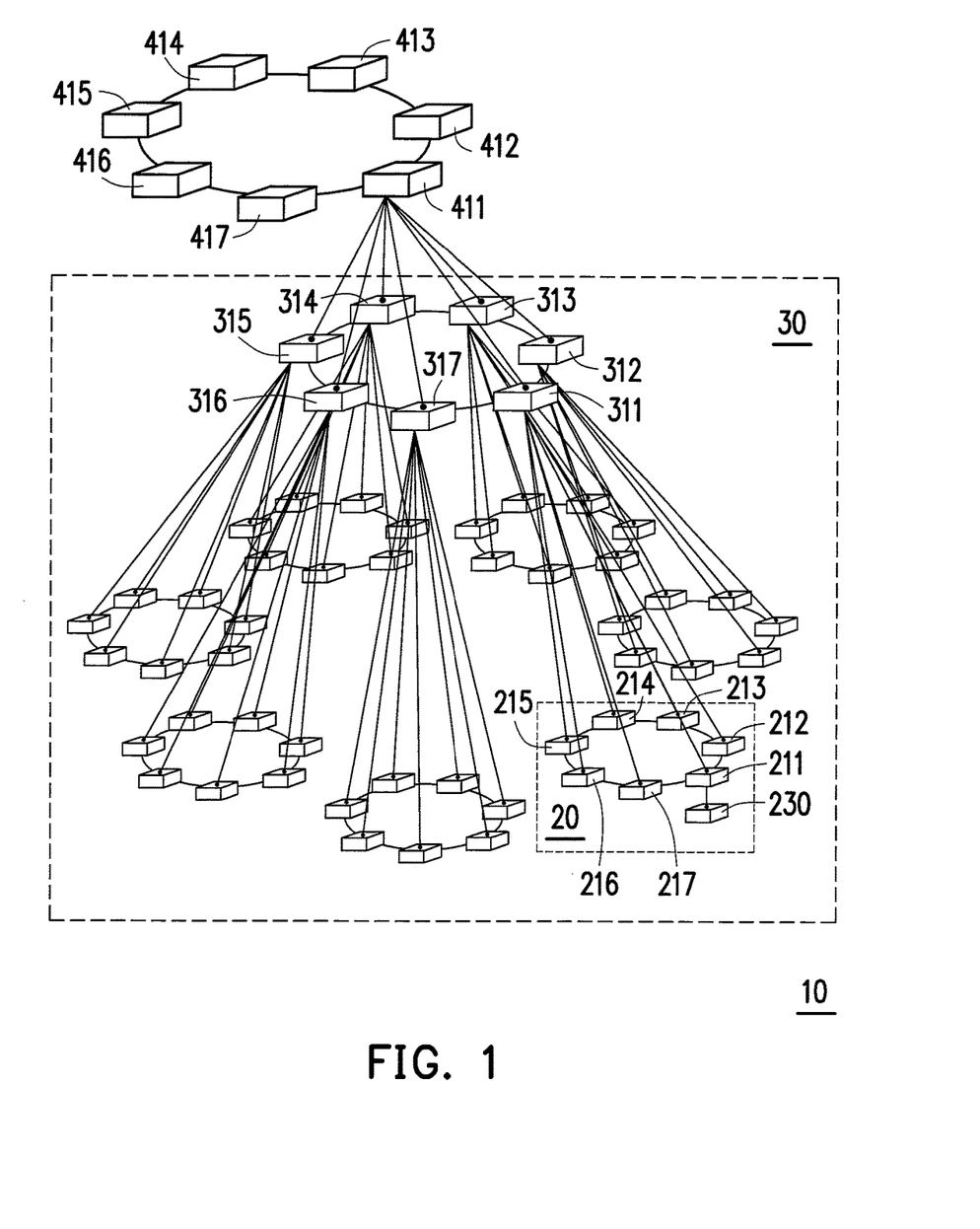
FIG. 1 is a schematic diagram of a system architecture of an optical data center network system according to an embodiment of the disclosure.

FIG. 1 is a schematic diagram of a system architecture of an optical data center network system according to an embodiment of the disclosure. Referring to FIG. 1, a full-scale optical data center network system 10 includes a plurality of tier-1 optical switches, a plurality of tier-2 optical switches and a plurality of tier-3 optical switches, for example, the tier-1 optical switches 211-217, tier-2 optical switches 311-317 and tier-3 optical switches 411-417 shown in FIG. 1. The tier-1 optical switches 211-217 form a pod 20, where the tier-1 optical switches 211-217 in the pod 20 are connected to each other through ribbon fibers. The tier-2 optical switches 311-317 form a macro pod 30, where the tier-2 optical switches 311-317 in the macro pod 30 are connected to each other through ribbon fibers, and each of the tier-2 optical switches 311-317 is connected to all of the tier-1 optical switches in one pod (for example, in the present embodiment, the tier-2 optical switch 311 is connected to all of the tier-1 optical switches 211-217 in the pod 20). The tier-3 optical switches 411-417 are connected to each other through ribbon fibers, and each of the tier-3 optical switches 411-417 is connected to all of the tier-2 optical switches in one macro pod (for example, in the present embodiment, the tier-3 optical switch 411 is connected to all of the tier-2 optical switches 311-317 in the macro pod 30).

In the present embodiment, the optical data center network system 10 is recursively constructed based on a pyramid architecture, and includes a polygonal base including an odd number (B) switching nodes connected through the ribbon fibers. The optical data center network system 10 includes two types of building blocks: a pod and a macro pod. The pod is the building block of a tier-1, and includes B tier-1 optical switches located at the base of the pyramid (i.e., tier-1 pyramid). For example, in the embodiment of FIG. 1, B is set as 7, and the pod 20 includes 7 tier-1 optical switches 211-217.

The optical data center network system 10 also includes a plurality of top of rack (ToR) switches and a plurality of servers. Each of the tier-1 optical switches (for example, the tier-1 optical switches 211-217) is connected to an apex of the pyramid thereof (i.e., the tier-2 optical switch 311), and is connected to the ToR switch through a plurality of wavelength optical transceivers. For example, the tier-1 optical switch 211 is connected to the ToR switch 230 through a plurality of wavelength optical transceivers (not shown). The ToR switch (for example, the ToR switch 230) is generally configured together with a rack (not shown), and the rack may contain one or more servers that are connected to the ToR switch 230. Data transmitted to the ToR switch 230 by the servers are transmitted in form of electrical signals, and the ToR switch 230 switches to selectively transmit the data to one of the wavelength optical transceivers. The wavelength optical transceiver converts the received electrical signal into an optical signal and transmits the data to the tier-1 optical switch 211. The wavelength optical transceivers can be respectively disposed on connection ports through which the tier-1 optical switch is connected the ToR switch or on connection ports through which the ToR switch is connected to the tier-1 optical switch, which is not limited by the disclosure.

On the other hand, as shown in FIG. 1, although the tier-1 optical switches 211-217 are connected to each other annularly, each of the tier-1 optical switches 211-217 (for example, the tier-1 optical switch 211) is connected to the tier-1 optical switches (for example, the tier-1 optical switches 212-217) belonging to the same pod in a point-to-point manner by using the ribbon fibers to form the pod, which is equivalent to a mesh network. The tier-1 optical switches 211-217 (in the pod 20) are also connected to the tier-2 optical switch through the ribbon fibers (for example, the pod 20 is connected to the tier-2 optical switch 311).

The macro pod is a relatively large building block extending from the tier-1 and to the tier-2, and includes B (or more than B) tier-2 optical switches that are mesh connected to form a base (the tier-2 optical switches 311-317 shown in FIG. 1) of the pyramid (i.e., tier-2 pyramid). Each of the tier-2 optical switches in the macro pod is connected downward to a pod, and is connected upward to the apex of the pyramid thereof (i.e., one of the tier-3 optical switches). For example, in the embodiment of FIG. 1, the tier-2 optical switch 311 in the macro pod 30 is connected downward to the pod 20, and is connected upward to the tier-3 optical switch 411. In this way, the macro pod at least includes B pods and $B^2$ tier-1 optical switches. Furthermore, the full-scale optical data center network system 10 includes B (or more than B) macro pods connected to each other through B tier-3 optical switches, and the B tier-3 optical switches (for example, the tier-3 optical switches 411-417 shown in FIG. 1) are also mesh connected (i.e., connected one-to-one through the ribbon fibers).

It should be noticed that the aforementioned building blocks can be deployed on demand basis. For example, when the number of the racks in the optical data center network system 10 is 3 B, the optical data center network system 10 only includes three tier-1 pyramids, in which B tier-1 optical switches are located at the base of each pyramid and one tier-2 optical switches is located at the apex of each pyramid. The tier-2 optical switches at the apex of the three pyramids are mesh connected with each other. In case of such demand, the optical data center network system 10 does not require the tier-3 optical switches of the tier-3 (i.e., it is unnecessary to construct an apex corresponding to the tier-2 pyramid of the macro pod).

In the present embodiment, the tier-1 optical switches 211-217, the tier-2 optical switches 311-317 and the tier-3 optical switches 411-417 are all full-optical switching nodes constructed by wavelength selective switches (WSSs) as building elements. The WSS attributes low-cost, low power consumption, high reliability, and very flexible at room temperature and can be quickly reconfigured (for example, a response time<10 ms), etc., so that the WSS would be suitable for being applied in the optical data center network system 10.

The optical data center network system 10 also includes a central controller, which is wired or wirelessly connected to all of the switching nodes in the optical data center network system 10. The switching nodes include the tier-1 optical switches (for example, the tier-1 optical switches 211-217), the tier-2 optical switches (for example, the tier-2 optical switches 311-317), the tier-3 optical switches (for example, the tier-3 optical switches 411-417) and the ToR switches (for example, the ToR switch 230). The central controller may transmit a plurality of control signals to all of the switching nodes in the optical data center network system 10 to control the switching nodes in the optical data center network system 10, so as to establish data transmission paths between servers. For example, the WSSs in the tier-1 optical switches 211-217, the tier-2 optical switches 311-317 and the tier-3 optical switches 411-417 can respectively receive one of the control signals from the central controller, and selectively switch (i.e., be reconfigured) according to the received control signal, so as to output different optical signals. Implementations of the tier-1 optical switches, the tier-2 optical switches and the tier-3 optical switches will be described below based on exemplary embodiments with B=7.

Figure 2:
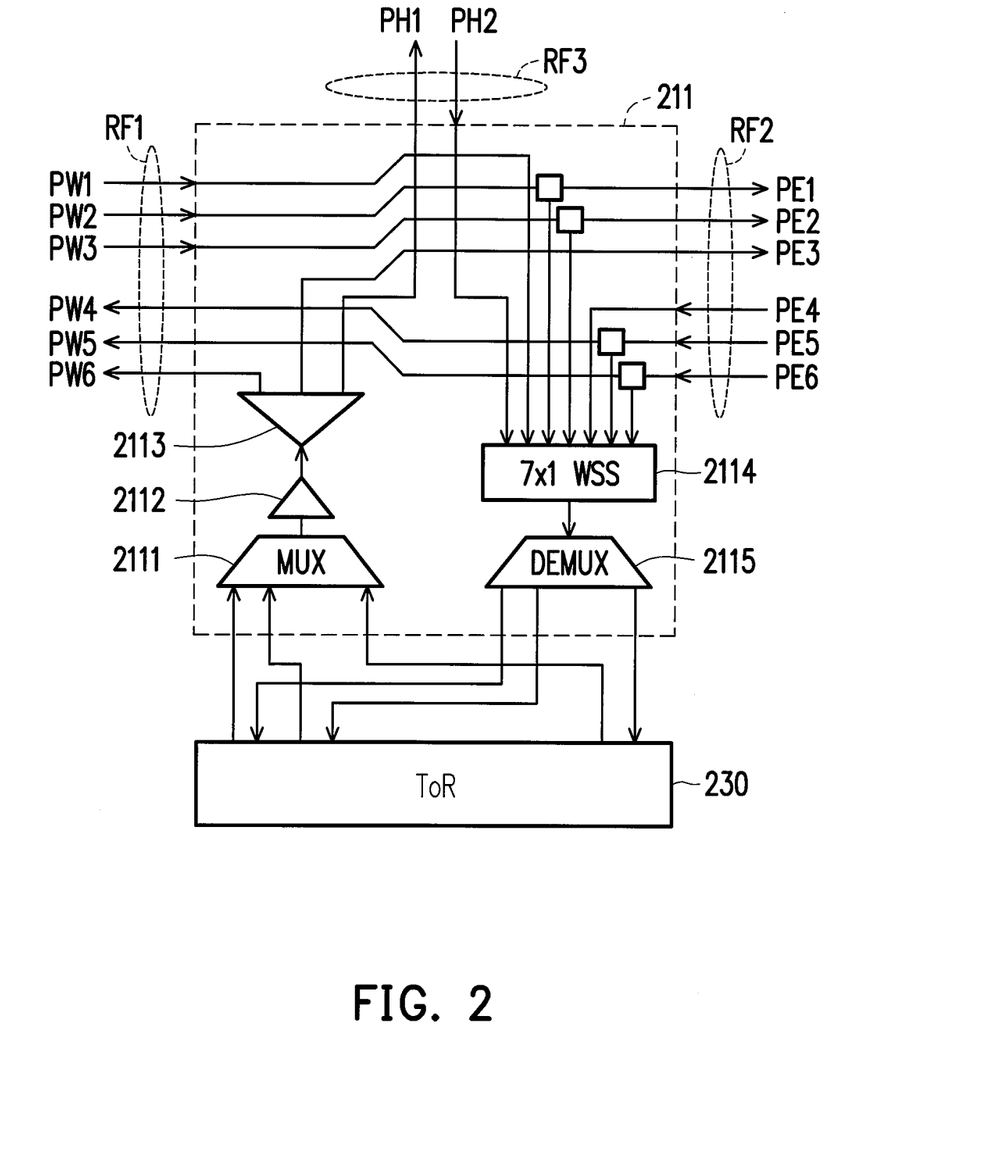
FIG. 2 is a structural schematic diagram of an optical switch according to an embodiment of the disclosure.

FIG. 2 is a structural schematic diagram of an optical switch according to an embodiment of the disclosure. The optical switch shown in FIG. 2 could be adapted to the optical data center network system, and could be, for example, the tier-1 optical switch 211 of the optical data center network system shown in FIG. 1. Referring to FIG. 2, the optical switch 211 includes a plurality of latitudinal ports connected to one of ribbon fibers RF1, RF2 (for example, west latitudinal ports PW1-PW6 at the left side of FIG. 2, and east latitudinal ports PE1-PE6 at the right side of FIG. 2), a plurality of longitudinal ports PH1-PH2 connected to a ribbon fiber RF3, a multiplexer (MUX) 2111, an optical signal amplifier 2112 coupled to the MUX 2111, an optical signal splitter 2113, a WSS 2114 and a de-multiplexer (DEMUX) 2115. The optical switch 211 is connected to (B−1)/2 optical switches located to the west of the optical switch 211 through the west latitudinal ports PW1-PW6 and is connected to (B−1)/2 optical switches located to the east of the optical switch 211 through the east latitudinal ports PE1-PE6. For example, in the embodiment of FIG. 1, (B−1)/2=3. The optical switch 211 is connected to the tier-1 optical switches 215-217 through the west latitudinal ports PW1-PW6 and is connected to the tier-1 optical switches 212-214 through the east latitudinal ports PE1-PE6. It is worth mentioning that packets/optical signals come from the same source are transmitted through a same fiber link (corresponding to one of the above latitudinal ports or longitudinal ports), and packets/optical signals come from different sources are transmitted to a same destination through different fiber links.

An input port of the optical signal splitter 2113 is coupled to the optical signal amplifier 2112, and an output port of the optical signal splitter 2113 is coupled to the longitudinal port PH1 and a first latitudinal port and a second latitudinal port in the latitudinal ports, where light transmitting directions of the first latitudinal port and the second latitudinal port are opposite to each other. For example, in the present embodiment, the first latitudinal port is the west latitudinal port PW6, and the second latitudinal port is the east latitudinal port PW3. Along a data uplink direction (a direction from the ToR switch 230 to the west latitudinal ports PW4-PW6, the east latitudinal ports PE1-PE3 and the longitudinal port PH1), the multiplexer 2111 receives a plurality of optical signals from the ToR switch 230 through a plurality of (for example, W) wavelength optical transceivers (not shown). Since the optical signals received by different wavelength optical transceivers probably have different wavelengths (for example, W wavelengths), the multiplexer 2111 combines the optical signals into a combined optical signal, and transmits the same to the optical signal amplifier 2112 through a single fiber. The optical signal amplifier 2112 can be an erbium doped fiber amplifier (EDFA) or other optical signal amplifier, which receives the combined optical signal and amplifies (e.g., boost the peak signal power) the combined optical signal to ensure that the combined optical signal has enough power.

The optical signal splitter 2113 receives the combined optical signal, and duplicates three copies of the combined optical signal (i.e., a first transmission optical signal, a second transmission optical signal, and a third transmission optical signal). In addition, the optical signal splitter 2113 respectively transmits the first transmission optical signal, the second transmission optical signal and the third transmission optical signal through the output port of the optical signal splitter 2113 to one of the longitudinal ports, the first latitudinal port in the latitudinal ports and the second latitudinal port in the latitudinal ports. Namely, the longitudinal port PH1 is for transmitting to the tier-2 optical switch 311, the west latitudinal port PW6 is for transmitting to the west (for example, a direction toward the tier-1 optical switches 217, 216, 215), and the east latitudinal port PE3 is for transmitting to the east (for example, a direction toward the tier-1 optical switches 212-214). In the present embodiment, the optical signal splitter 2113 may include a passive optical signal splitter, for example, a 3-way optical signal splitter and a plurality of tap couplers. Moreover, although the optical signal splitter 2113 duplicates the combined optical signal to generate three transmission optical signals in the present embodiment, the number of the transmission optical signals can be modified according to an actual requirement in other embodiments, which is not limited by the disclosure.

The WSS 2114 is coupled to part or all of the latitudinal ports (i.e., the west latitudinal ports PW1-PW6 and the east latitudinal ports PE1-PE6) and part or all of the longitudinal ports PH1 and PH2. The DEMUX 2115 is coupled to the WSS 2114 and is connected to the ToR switch 230. The WSS 2114 receives a plurality of the optical signals from part or all of the latitudinal ports and part or all of the longitudinal ports, and switches according to one of the control signals received from the central controller to transmit one of the received optical signals to the DEMUX 2115. In brief, the WSS 2114 is coupled to all of the connection ports of a data downlink direction (i.e., a direction from the west latitudinal ports PW1-PW6, the east latitudinal ports PE1-PE6 and the longitudinal ports PH1, PH2 to the ToR switch 230). Namely, the connection ports are the west latitudinal ports PW1-PW3, the east latitudinal ports PE4-PE6 and the longitudinal port PH2. The WSS 2114 has N input ports and one output port (N×1 WSS), and selects W optical signals from the B input ports according to the control signal transmitted by the central controller. The W optical signals contain (B−1)/2 optical signals coming from the west latitudinal ports PW1-PW3, (B−1)/2 optical signals coming from the east latitudinal ports PE4-PE6, and one optical signal coming from the longitudinal port PH2. Therefore, in the present embodiment, the number N of the input ports of the WSS 2114 is equal to B (i.e., equal to 7). The DEMUX 2115 demultiplexes the received optical signal into a plurality of optical signals with different wavelengths, and transmits the optical signals to the ToR switch 230 through the corresponding wavelength optical transceivers.

Figure 3:
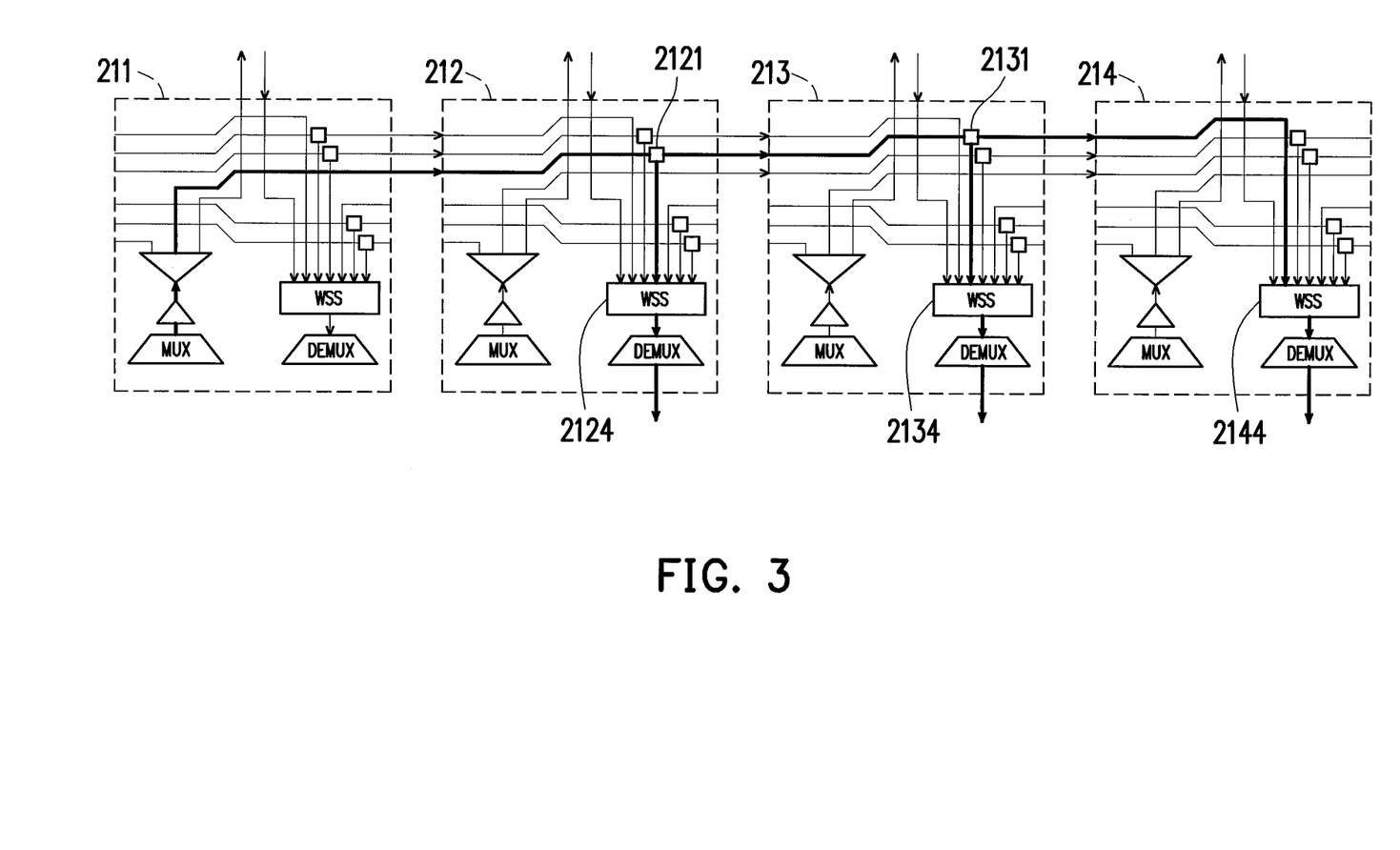
FIG. 3 is a schematic diagram illustrating a coupling relationship between tier-1 optical switches according to an embodiment of the disclosure.

FIG. 3 is a schematic diagram illustrating a coupling relationship between the tier-1 optical switches according to an embodiment of the disclosure. Referring to FIG. 1 and FIG. 2, in the present embodiment, it is assumed that the tier-1 optical switch 211 is set to transmit the optical signal to the east, i.e., transmits the optical signal through the east latitudinal ports PE1-PE3. First, the optical signal to be transmitted to the east in the tier-1 optical switch 211 is transmitted to the adjacent tier-1 optical switch 212 located at the east of the optical switch 211 through a fiber. The optical signal is duplicated into two optical signals by a tap coupler 2121 in the tier-1 optical switch 212. One of the optical signals is transmitted to a WSS 2124 in the tier-1 optical switch 212, and the other one of the optical signals is continually transmitted to the adjacent tier-1 optical switch 213 located at the east of the optical switch 212 through a fiber. The optical signal is then duplicated into two optical signals in the same way by a tap coupler 2131 in the tier-1 optical switch 213. One of the optical signals is transmitted to a WSS 2134 in the tier-1 optical switch 213, and the other one of the optical signals is continually transmitted to the adjacent tier-1 optical switch 214 located at the east of the optical switch 213 through a fiber. Since the tier-1 optical switch 214 is the last node located at the east of the tier-1 optical switch 211, the optical signal is directly transmitted to a WSS 2144 in the tier-1 optical switch 214 without being further transmitted.

Based on the above described broadcasting transmission and connection mechanism, the optical signal sent by the ToR switch 230 to the tier-1 optical switch 211 can be transmitted to the tier-1 optical switches 212-214. In addition, the WSSs 2124, 2134, 2144 in the tier-1 optical switches 212-214 could selectively determine whether to receive the optical signal. It should be noticed that all of the fiber links shown in FIG. 3 can be included in a ribbon fiber, so that one pod in FIG. 1 (for example, the pod 20 shown in FIG. 1) is illustrated as a ring (or an appearance thereof in a real configuration). Moreover, the number of the nodes used in the embodiments of FIG. 1 and FIG. 3 is 7 (i.e., B=7), so that the farthest distance for switching data/optical signal in the same pod (for example, the pod 20 of FIG. 1) is 3 (i.e., 3 tier-1 optical switches to the east or 3 switch nodes to the west).

Figure 4A:
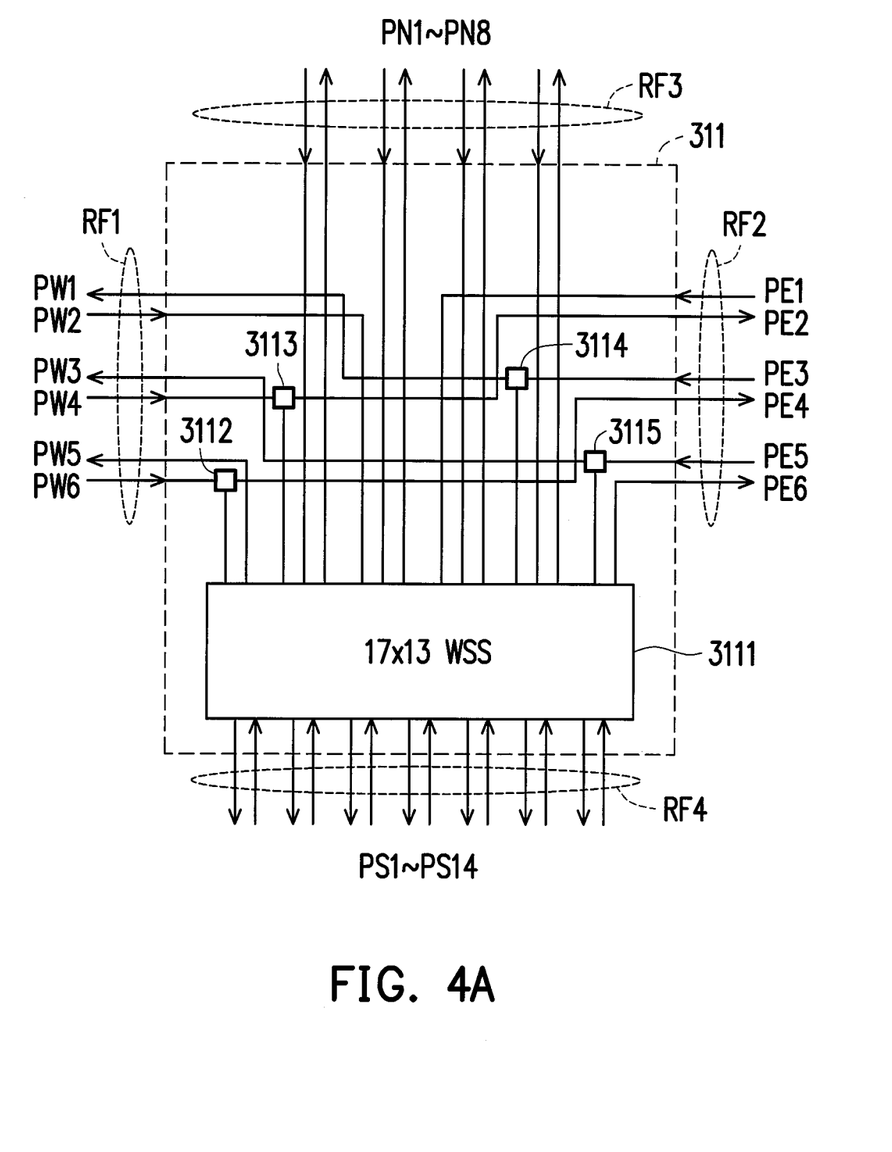
FIG. 4A is a structural schematic diagram of an optical switch according to an embodiment of the disclosure.

FIG. 4A is a structural schematic diagram of an optical switch according to an embodiment of the disclosure. The optical switch shown in FIG. 4A corresponds to the tier-2 optical switches 311-317 in the optical data center network system of FIG. 1. Referring to FIG. 4A, in the present embodiment, the optical switch 311 can be regarded as a wavelength cross connector (WXC). The optical switch 311 includes a WSS 3111, a plurality of latitudinal ports (including the west latitudinal ports PW1-PW6 and the east latitudinal ports PE1-PE6), longitudinal ports (including north longitudinal ports PN1-PN8 and south longitudinal ports PS1-PS14), and tap couplers 3112-3115.

Similar to the tier-1 optical switches 211-217 shown in FIG. 1, when the number of the nodes in the pod and the macro pod is B=7, the optical switch 311 is respectively connected to three adjacent tier-2 optical switches located at the east the optical switch 311 and three adjacent tier-2 optical switches located at the west of the optical switch 311. In detail, the optical switch 311 is respectively connected to the optical switches (for example, the tier-2 optical switches 315-317 in FIG. 1) located at the west of the optical switch 311 in the same pod and the optical switches (for example, the tier-2 optical switches 312-314 in FIG. 1) located at the east of the optical switch 311 through the west latitudinal ports PW1-PW6 and the east latitudinal ports PE1-PE6, respectively.

The optical switch 311 is connected to the tier-3 optical switch (for example, the tier-3 optical switch 411 of FIG. 1) by using the north longitudinal ports PN1-PN8 through the ribbon fiber RF3. The optical switch 311 is also connected to the B tier-1 optical switches 211-217 in the pod of the tier-1 (the pod 20 of FIG. 1) by using the south longitudinal ports PN1-PN14 through a ribbon fiber RF4. In the present embodiment, since a capacity between the tier-2 and the tier-3 requires to be close to 4 W in order to ensure the oversubscription ratio between the tier-2 and the tier-3 to be close to 1, the ribbon fiber RF3 connected to the north includes four pairs of parallel fibers (which are respectively coupled to the north longitudinal ports PN1-PN8).

Generally, in case that B=7, the optical switch 311 has 17 input ports and 17 output ports (which are, respectively 3+3+7+4=17). Since two sets of the latitudinal ports in the west latitudinal ports and the east latitudinal ports are directly connected to each other without connecting the WSS 3111, the WSS 3111 can be streamlined to be 17 input ports and 13 output ports (17×13), rather than 17×17.

Figure 4B:
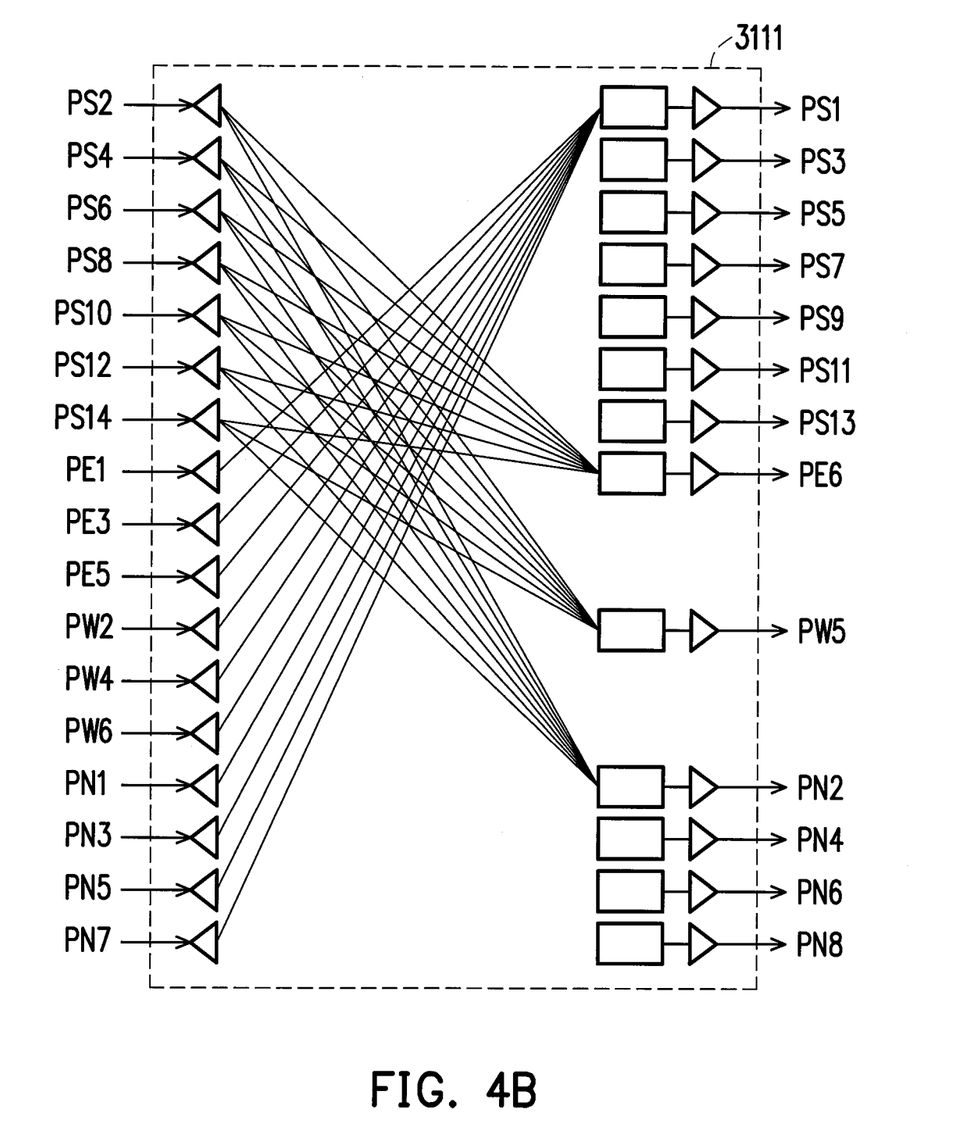
FIG. 4B is a structural schematic diagram of a WSS in the optical switch of FIG. 4A.

FIG. 4B is a structural schematic diagram of the WSS in the optical switch of FIG. 4A. Referring to FIG. 4B, in the structure of the WSS 3111 shown in FIG. 4B, a set of splitters, compact WSS elements, and optical amplifiers are used to implement the 17×13 WSS 3111. The 17×13 WSS 3111 is implemented by several 1×6 and 1×7 splitters (which are represented by triangle block with a vertex point toward the left in FIG. 4B), several 7×1 and 10×1 WSS elements (which are represented by rectangular block in FIG. 4B), and several optical amplifiers (which are represented by triangle block with a vertex point toward the right in FIG. 4B). Seven 1×6 splitters connected to the tier-1 pod 20 (i.e., respectively connected to the south longitudinal ports PS2, PS4, PS6, PS8, PS10, PS12, PS14) are respectively connected to six 7×1 WSSs. One of the six 7×1 WSSs is coupled to the east latitudinal port PE6, another is coupled to the west latitudinal port PW5, and the other four are coupled to the north longitudinal ports PN2, PN4, PN6 and PN8. Three of ten 1×7 splitters are respectively coupled to the east latitudinal ports PE1, PE3, and PE5. Other three of the ten 1×7 splitters are respectively coupled to the west latitudinal ports PW2, PW4, and PW6. In addition, still other four of the ten 1×7 splitters are respectively coupled to the north longitudinal ports PN1, PN3, PN5, and PN7. These ten 1×7 splitters respectively receive data/optical signal coming from the west and the east of the optical switch 311 and the tier-3 optical switch 411, and respectively transmit the data/optical signal to each of the 10×1 WSSs (i.e., the seven WSSs respectively coupled to the south longitudinal ports PS1, PS3, PS5, PS7, PS9, PS11 and PS13) of the tier-1 pod. The connection relationship between the optical switch 311 and the other tier-2 optical switches (for example, the tier-2 optical switches 312-317) would be similar to the connection relationship between the tier-1 optical switches 211-217

(i.e., the tier-2 optical switches 211-217 in the same macro pod (the macro pod 30) are connected to form a peer-to-peer mesh network).

It should be noticed that the connection relationships between the input ports and the output ports are shown schematically in FIG. 4B for the purpose of illustration. As discussed above, the 10×1 WSS connected to the south longitudinal port PS1 is connected to the splitters that are respectively coupled to the east latitudinal ports PE1, PE3, PE5, the west latitudinal ports PW2, PW4, PW6, and the north longitudinal ports PN1, PN3, PN5, PN7. Similar to the 10×1 WSS, each of the WSSs respectively coupled to the PS3, PS5, PS7, PS9, PS11, PS13 is also connected to the splitters already respectively coupled to the east latitudinal ports PE1, PE3, PE5, the west latitudinal ports PW2, PW4, PW6, and the north longitudinal ports PN1, PN3, PN5 and PN7. Furthermore, FIG. 4B shows that the 7×1 WSS connected to the north longitudinal port PN2 is connected to the seven 1×6 splitters that are respectively coupled to the south longitudinal ports PS2, PS4, PS6, PS8, PS10, PS12, and PS14. Similar to the 7×1 WSS connected to the north longitudinal port PN2, each of the 7×1 WSSs respectively coupled to the north longitudinal ports PN4, PN6, PN8 is also connected to the seven 1×6 splitters that are respectively coupled to the south longitudinal ports PS2, PS4, PS6, PS8, PS10, PS12, and PS14.

In an embodiment, a hardware structure of each of the tier-3 optical switches 411-417 is similar to the tier-2 optical switches 311-317, which mainly includes a WSS. In the structure, the switching of all of the optical switches may be determined by selection of the WSS. For example, the switching of the optical switches may be determined according to an instruction/control signal sent from the central controller. It should be noticed that the tier-3 optical switches 411-417 of the present embodiment only have nodes connected to three directions (for example, the east, the west and the south directions, without the north direction). Connections between the WSS and each of the tier-2 optical switches require 4 sets of input/output ports, so that 28 input/output ports are required for connecting the seven tier-2 optical switches. Regarding the connections between the WSS and the other tier-3 optical switches located at the east and the west of the tier-3 optical switch (for example, connections between the tier-3 optical switch 411 and the other tier-3 optical switches 412-417), after considering the required bandwidth, 12×3 sets of input/output ports respectively located at the east and the west of the tier-3 optical switch are required to be configured. As a result, a 100×100 WSS would be required theoretically. However, regarding the currently commercial WSSs, it is hard to implement the WSS with such huge input/output ports. In order to resolve such problem, in the present embodiment, the value of B is also set to 7, which is similar to the aforementioned embodiment. Particularly, each of the tier-3 optical switches is divided into 4 sets of independent modules, and each module in the tier-3 optical switch would be only connected to one module in the other six tier-3 optical switches.

Figure 5:
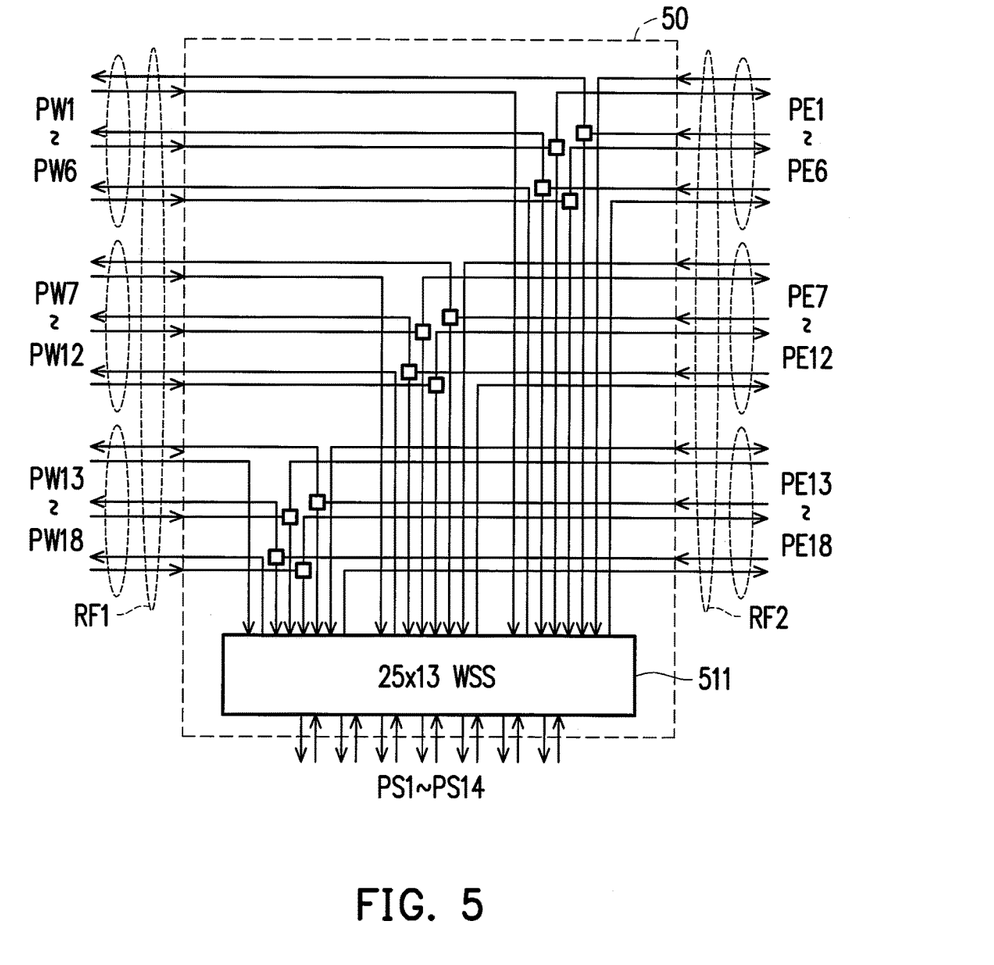
FIG. 5 is a structural schematic diagram of a module in an optical switch according to an embodiment of the disclosure.

FIG. 5 is a structural schematic diagram of a module in an optical switch according to an embodiment of the disclosure. The module shown in FIG. 5 corresponds to one of four hardware modules in one of the tier-3 optical switches illustrated in FIG. 1. Referring to FIG. 5, each module 50 of the tier-3 optical switch only requires 9 input ports and 9 output ports (i.e., =(12/4)×3) toward the east direction and the west direction. Meanwhile, the module 50 of the tier-3 optical switch 411 only requires one set of input/output port for connecting with each of the tier-2 optical switches (for example, one of the tier-2 optical switches 311-317), and requires totally 7 sets of input/output ports for connecting with one macro pod (for example, the macro pod 30). Therefore, a WSS 511 in one module of the tier-3 optical switch 411 only requires 25 input ports (i.e., 9+9+7) and 13 output ports (i.e., 3+3+7), namely, a 25×13 WSS 511. Therefore, a sum of the input/output ports of the four modules in one tier-3 optical switch would be still smaller than the aforementioned theoretical value of 100 input ports and 100 output ports.

A structure of the 25×13 WSS 511 is similar to the structure of the 17×13 WSS 3111 in the tier-2 optical switch 311 of FIG. 4A-FIG. 4B. The difference between two structures is that, the number of fiber connections to the west and the east (corresponding to the number of the input/output ports) in the 25×13 WSS 511 of the module 50 of the tier-3 optical switch is three times more than that of the tier-2 optical switch 311. As a result, more splitters and compact WSSs (i.e., the 10×1 WSS shown in FIG. 4B) are required in order to construct the 25×13 WSS 511. On the other hand, the connection relationship between the tier-3 optical switches 411-417 is also similar to the connection relationship between the tier-1 optical switches 211-217 in the pod 20 of the tier-1. The tier-3 optical switches (i.e., the seven tier-3 optical switches 411-417 connected to each other) of the same pod are connected to form a mesh network through peer-to-peer connection. Since each of the tier-3 optical switches 411-417 is implemented by four independent modules unconnected to each other, an overall data throughput is probably decreased. However, it is proved through experiment that such resource-segregated configuration actually causes an influence of about 2%, which seems negligible for overall efficiency.

On the other hand, the optical data center network system 10 may gain reliability and fault tolerance ability in the hardware system by the resource-segregated configuration. For example, when one of the modules in the tier-3 optical switch has a malfunction, the other modules in the tier-3 optical switch would not be affected. In addition, the optical data center network system 10 can still normally operate without being interfered.

The number of fiber connections between the switching nodes in each tier and the switching nodes between different tiers is also one of the important issues to be solved in the present disclosure. Since all of data has to be transmitted through the fiber connections, the number of the required fibers needs to be determined according to the amount of data flow through each switching node, and the number (i.e., the aforementioned B value) of the switching nodes (for example, the tier-1 optical switches, the tier-2 optical switches or the tier-3 optical switches) in each of the switching modules (for example, the pod or the macro pod). It is assumed that each fiber could include W kinds of optical signals with different wavelengths, and a bandwidth required by each data flow is the optical signal of a single wavelength. The number of different wavelengths required between the switching node and the adjacent switching node (latitudinal adjacent and longitudinal adjacent) in order to achieve the oversubscription ratio to be close to 1 is calculated below, which is referred to as an edge capacity. Since data exchange between the servers is occurred throughout the entire data center (i.e., the entire optical data center network system 10), it is assumed that P represents a probability that a destination server is in a same macro pod with a given source server, and 1−P represents the probability that the destination server is located out of the macro pod. Therefore, the higher the P value is, the more significant that the data flow is confined to a local exchange, and conversely, the trend of cross pod (tier) data exchange is more significant. Therefore, a following table 1 is obtained after calculation:

TABLE 1

| Switching node | Edge capacity adjacent to east and west | Fiber number adjacent to east and west |
|---|---|---|
| Tier-1 optical switch | W | (B−1) |
| Tier-2 optical switch | $\dfrac{B \cdot W \cdot P \cdot (1-P)}{2}$ | $\text{round}\left[\dfrac{B \cdot P \cdot (1-P)}{2}\right] \cdot (B-1) \cdot 2$ |
| Tier-3 optical switch | $\dfrac{B^2 \cdot W \cdot P \cdot (1-P)}{2}$ | $\text{round}\left[\dfrac{B^2 \cdot P \cdot (1-P)}{2}\right] \cdot (B-1) \cdot 2$ |

| Switching node | Edge capacity adjacent to north | Fiber number adjacent to north |
|---|---|---|
| Tier-1 optical switch | W | 2 |
| Tier-2 optical switch | $B \cdot W \cdot P \cdot (1-P)$ | $\text{round}[B \cdot W \cdot P \cdot (1-P)] \cdot 2$ |
| Tier-3 optical switch | none | none |

Table 1 also includes the fiber numbers actually required between various switching nodes and the adjacent switching nodes in order to satisfy the aforementioned edge capacities. The connections of the switching nodes in the system of the disclosure (e.g., as shown in FIG. 1 and FIG. 3) are implemented through the peer-to-peer mesh network in the direction of east and west, and all of the connections pass through every switching nodes. Therefore, the bandwidth of each of the switching nodes to the east and west has to be (B−1)/2 times of the edge capacity. Thus, considering a bandwidth required for reception, (B−1) times of the edge capacity are required in total. As it is known that each fiber may include W kinds of optical signals with different wavelengths, the totally required number of the fibers can be obtained (integer number could be obtained by taking a round function to the calculation result). On the other hand, regarding the bandwidth to the north, only two cases of transmitting and receiving need to be considered, i.e., twice of the edge capacity is required. The detailed values may refer to Table 1, and the P value in Table 1 can be set according to an actual requirement or an actual measurement result. It should be noticed that the fibers required in Table 1 can be included in a general ribbon fiber. Therefore, the network connection of the same tier looks like a ring from external (shown as FIG. 1), which is simple and clear.

Figure 6:
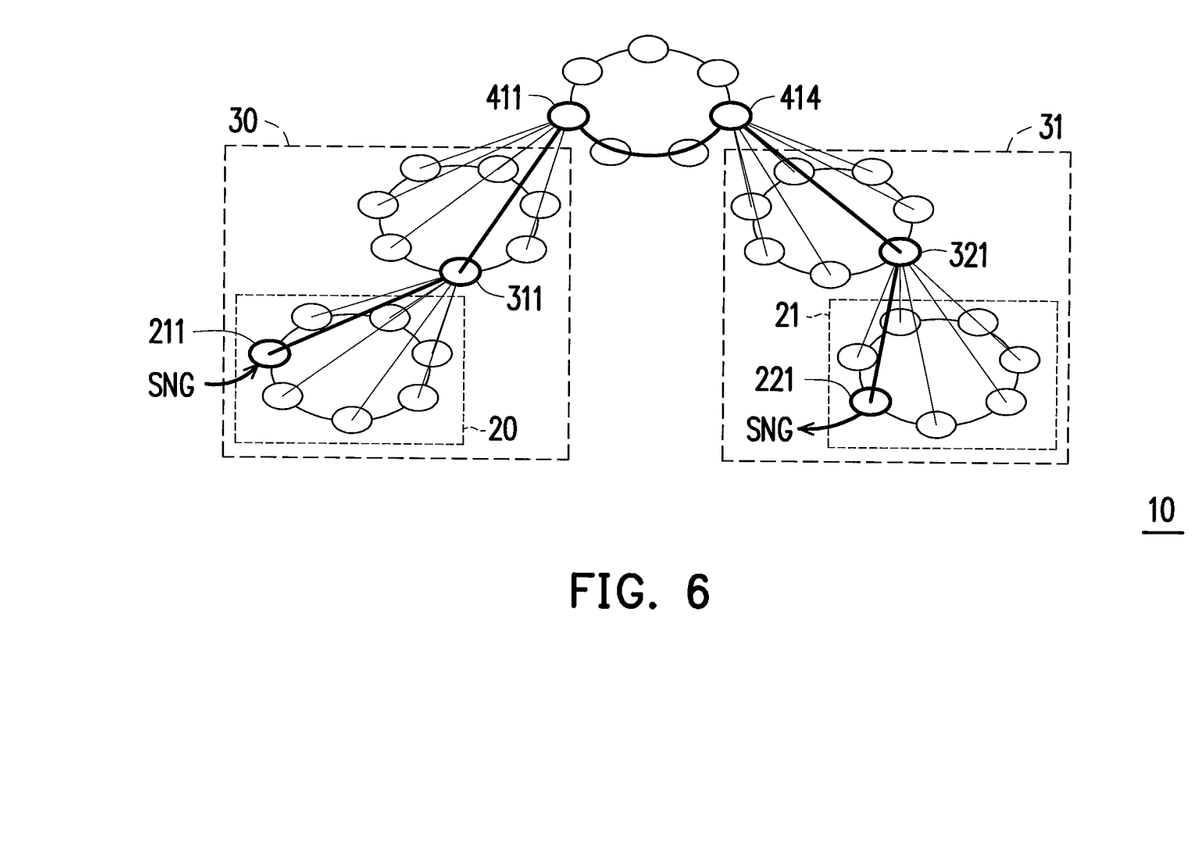
FIG. 6 is a schematic diagram of a longest data transmission path in the optical data center network system according to an embodiment of the disclosure.

In the optical data center network system 10 of the present disclosure, regarding signal transmission between the optical switches of the same tier, only selection of the optical signal of different wavelengths is performed through a splitter and a WSS. Hence, the signal quality is not influenced except for the energy degradation due to path loss. FIG. 6 is a schematic diagram of a longest data transmission path in the optical data center network system according to an embodiment of the disclosure. Referring to FIG. 6, an optical signal SNG is received by the tier-1 optical switch 211, and is transmitted to the tier-2 optical switch 311 belonging to the same macro pod by the tier-1 optical switch 211. The optical switch 311 transmits the optical signal SNG to the tier-3 optical switch 411 through the selection of the WSS thereof. The tier-3 optical switch 411 transmits the optical signal SNG to the other tier-3 optical switches 412-414 through a broadcasting manner. The tier-3 optical switch 414 transmits the optical signal SNG to the tier-2 optical switch 321 in the macro pod 31 connected to the tier-3 optical switch 414 through the selection of the WSS thereof. The tier-2 optical switch 321 further transmits the optical signal SNG to the tier-1 optical switch 221 in the pod 21 connected to the tier-2 optical switch 321 through the selection of the WSS thereof.

In the longest path depicted in FIG. 6, there are totally five WSSs and five optical signal amplifiers. One of the optical signal amplifiers is located in the tier-1, two are located in the tier-2, and still other two are located in the tier-3. The optical signal amplifiers of each tier may have different gains ranged from 5 dB to 10 dB. According to an experiment, it is known that after the optical signal SNG passes through five WSSs, the optical signal would not have a signal distortion due to the filtering effect of the WSSs. Moreover, considering the energy loss of the passive elements and the gains of the amplifiers, the energy of the optical signal input and output by each amplifier is learned. According to the experiment, it is known that even the optical signal SNG passes through the longest path, the power of the optical signal SNG received by the output port (i.e., the tier-1 optical switch 221) is still in consistence with the demand of the optical data center network system 10.

In summary, the disclosure provides the optical data center network system with a pyramid shape and the optical switches in each tier thereof, which has advantages of high scalability, high bandwidth, low latency, low power consumption, low wiring complexity, and high fault tolerance, etc. Based on the design of modularity and progressive scalability, a constructor or maintainer of the optical data center network can arbitrarily add and delete the switching nodes according to an actual requirement, and can also modify system parameters (for example, the aforementioned B value, W value or P value) according to the actual requirement.

It will be apparent to those skilled in the art that various modifications and variations can be made to the architecture of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An optical data center network system, comprising:
   a plurality of tier-1 optical switches, grouped into a plurality of first pods, wherein the tier-1 optical switches in each of the first pods are connected to each other through ribbon fibers, and each of the tier-1 optical switches are connected to all the other tier-1 optical switches belonging to the same first pod in a point to point manner;
   a plurality of tier-2 optical switches, grouped into a plurality of first macro pods, wherein the tier-2 optical switches in each of the first macro pods are connected to each other through ribbon fibers, and each of the tier-2 optical switches are connected to all the other tier-2 optical switches belonging to the same first macro pod in the point to point manner, wherein all the tier-1 optical switches in each of the first pods are connected to only one of the tier-2 switches, and each of the tier-2 optical switches is connected to all the tier-1 optical switches of only one of the first pods; and
   a plurality of tier-3 optical switches, connected to each other through ribbon fibers, and each of the tier-3 optical switches are connected to all the other tier-3 optical switches in the point to point manner, wherein all the tier-2 optical switches in each of the first macro pods are connected to only one of the tier-3 switches, and each of the tier-3 optical switches is connected to all the tier-2 optical switches of only one of the first macro pods.

2. The optical data center network system as claimed in claim 1, further comprising:
a plurality of top of rack (ToR) switches, wherein each of the top of rack switches is connected to one of the tier-1 optical switches through a plurality of wavelength optical transceivers; and
a central controller, connected to the tier-1 optical switches, the tier-2 optical switches, the tier-3 optical switches and the top of rack switches, and transmitting a plurality of control signals to the tier-1 optical switches, the tier-2 optical switches, the tier-3 optical switches and the top of rack switches to control the tier-1 optical switches, the tier-2 optical switches, the tier-3 optical switches and the top of rack switches.

3. The optical data center network system as claimed in claim 1, wherein
the first pod comprises B tier-1 optical switches, wherein B is a positive odd integer,
the first macro pod comprises B or more than B tier-2 optical switches, and
the number of the tier-3 optical switches is greater than or equal to B.

4. The optical data center network system as claimed in claim 3, wherein
each of the tier-1 optical switches comprises a plurality of latitudinal ports and a plurality of longitudinal ports, wherein each of the tier-1 optical switches is connected to the rest of tier-1 optical switches in the first pod through the latitudinal ports connected to the ribbon fibers, and is connected to the tier-2 optical switch that connected to the first pod through the longitudinal ports,
wherein the number of the latitudinal ports of each of the tier-1 optical switches is greater than or equal to 2(B−1), and the number of the longitudinal ports of each of the tier-1 optical switches is greater than or equal to 2.

5. The optical data center network system as claimed in claim 4, wherein each of the tier-1 optical switches comprises:
a multiplexer, connected to the top of rack switch;
an optical signal amplifier, coupled to the multiplexer; and
an optical signal splitter, having an input port coupled to the optical signal amplifier, and an output port coupled to one of the longitudinal ports, a first latitudinal port in the latitudinal ports and a second latitudinal port in the latitudinal ports, wherein light transmitting directions of the first latitudinal port and the second latitudinal port are opposite to each other,
wherein the multiplexer receives a plurality of optical signals from the top of rack switch, and combines the optical signals into a combined optical signal,
the optical signal amplifier receives the combined optical signal and amplifies the combined optical signal, and
the optical signal splitter receives the combined optical signal, and duplicates the combined optical signal to generate a first transmission optical signal, a second transmission optical signal and a third transmission optical signal, and the optical signal splitter respectively transmits the first transmission optical signal, the second transmission optical signal and the third transmission optical signal through the output port of the optical signal splitter to one of the longitudinal ports and the first latitudinal port and the second latitudinal port coupled to the output port of the optical signal splitter.

6. The optical data center network system as claimed in claim 4, wherein each of the tier-1 optical switches comprises:
a wavelength selective switch, coupled to part or all of the latitudinal ports and part or all of the longitudinal ports; and
a demultiplexer, coupled to the wavelength selective switch and connected to one of the top of rack switches,
wherein the wavelength selective switch receives a plurality of received optical signals from part or all of the latitudinal ports and part or all of the longitudinal ports, and the wavelength selective switch switches to transmit one of the received optical signals to the demultiplexer according to one of the control signals received from the central controller, and
the demultiplexer demultiplexer the received optical signal into a plurality of optical signals, and transmits the optical signals to the top of rack switch.

7. The optical data center network system as claimed in claim 4, wherein
each of the tier-2 optical switches comprises a plurality of latitudinal ports and a plurality of longitudinal ports, wherein each of the tier-2 optical switches is connected to rest of the tier-2 optical switches in the first macro pod through the latitudinal ports that are connected to the ribbon fibers, and is connected to the first pod and the tier-3 optical switch that is connected to the first macro pod through the longitudinal ports,
where the number of the latitudinal ports of each of the tier-2 optical switches is greater than or equal to $$\text{round}\left[\frac{B \cdot P \cdot (1-P)}{2}\right] \cdot (B-1) \cdot 2,$$

where P value is a predetermined constant value between 0 and 1, and
the longitudinal ports of each of the tier-2 optical switches comprise a plurality of north longitudinal ports and a plurality of source longitudinal ports, wherein the number of the north longitudinal ports is greater than or equal to round[B·(1−P)]·2.

8. The optical data center network system as claimed in claim 7, wherein each of the tier-2 optical switch comprises:
a wavelength selective switch, having M input ports and N output ports, wherein M and N are positive integers, and a sum of M and N is equal to a sum of the latitudinal ports and the longitudinal ports of the tier-2 optical switch.

9. The optical data center network system as claimed in claim 4, wherein
each of the tier-3 optical switches comprises a plurality of latitudinal ports and a plurality of longitudinal ports, wherein each of the tier-3 optical switches is connected to rest of the tier-3 optical switches through the latitudinal ports that are connected to the ribbon fibers, and one of the tier-3 optical switches is connected to the first macro pod through the longitudinal ports of the tier-3 optical switch, wherein the number of the latitudinal ports of each of the tier-3 optical switches is greater than or equal to $$\text{round}\left[\frac{B^2 \cdot P \cdot (1-P)}{2}\right] \cdot (B-1) \cdot 2,$$

where P value is a predetermined constant value between 0 and 1.

10. The optical data center network system as claimed in claim 9, wherein each of the tier-3 optical switch comprises:
  a wavelength selective switch, having Q input ports and R output ports, wherein Q and R are positive integers, and a sum of Q and R is equal to a sum of the latitudinal ports and the longitudinal ports of the tier-3 optical switch.

11. An optical switch, adapted to a tier-2 of an optical data center network system, the optical switch comprising:
  a plurality of latitudinal ports and a plurality of longitudinal ports, wherein the optical switch is connected to rest of the optical switches in a macro pod in the optical data center network system through the latitudinal ports that are connected to ribbon fibers, and is connected to a pod and a tier-3 optical switch that is connected to the macro pod in the optical data center network system through the longitudinal ports; and
  a wavelength selective switch, having M input ports and N output ports, wherein M and N are positive integers, and a sum of M and N is equal to a sum of the latitudinal ports and the longitudinal ports of the tier-2 optical switch, wherein the number of the latitudinal ports is greater than or equal to $$\text{round}\left[\frac{B \cdot P \cdot (1-P)}{2}\right] \cdot (B-1) \cdot 2,$$

where P value is a predetermined constant value between 0 and 1, and B value is the number of the optical switches in the macro pod, and
  the longitudinal ports comprise a plurality of north longitudinal ports and a plurality of source longitudinal ports, wherein the number of the north longitudinal ports is greater than or equal to round $[B \cdot (1-P)] \cdot 2$.

12. An optical switch, adapted to a tier-3 of an optical data center network system, the optical switch comprising:
  a plurality of latitudinal ports and a plurality of longitudinal ports, wherein the optical switch is connected to rest of the optical switches through the latitudinal ports that are connected to ribbon fibers, and is connected to a macro pod in the optical data center network system through the longitudinal ports;
  a wavelength selective switch, having Q input ports and R output ports, wherein Q and R are positive integers, and a sum of Q and R is equal to a sum of the latitudinal ports and the longitudinal ports of the optical switch, wherein the number of the latitudinal ports of each of the tier-3 optical switches is greater than or equal to $$\text{round}\left[\frac{B^2 \cdot P \cdot (1-P)}{2}\right] \cdot (B-1) \cdot 2,$$

where P value is a predetermined constant value between 0 and 1, and B value is the number of the optical switches.

* * * * *